US012783823B2

(12) United States Patent
Butler et al.

(10) Patent No.: US 12,783,823 B2
(45) **Date of Patent: *Nov. 3, 2026**

(54) SOFTWARE-BASED RFID TAG EMULATOR

(71) Applicant: T-Mobile Innovations LLC, Overland Park, KS (US)

(72) Inventors: Robert Keith Butler, Overland Park, KS (US); Lyle W. Paczkowski, Mission Hills, KS (US)

(73) Assignee: T-Mobile Innovations LLC

( * ) Notice: Subject to any disclaimer, the term of this patent is extended or adjusted under 35 U.S.C. 154(b) by 14 days.

This patent is subject to a terminal disclaimer.

(21) Appl. No.: 18/927,632

(22) Filed: Oct. 25, 2024

(65) Prior Publication Data

US 2025/0053757 A1 Feb. 13, 2025

Related U.S. Application Data

(63) Continuation of application No. 18/167,066, filed on Feb. 9, 2023, now Pat. No. 12,153,986.

(51) Int. Cl.
*G06K 7/10* (2006.01)

(52) U.S. Cl.
CPC ..... *G06K 7/10138* (2013.01); *G06K 7/10099* (2013.01)

(58) Field of Classification Search
CPC ....................... G06K 7/10138; G06K 7/10099
See application file for complete search history.

(56) References Cited

U.S. PATENT DOCUMENTS 4,377,741 A 3/1983 Brekka et al.
9,378,484 B1 * 6/2016 Russell .............. G06K 7/10356
9,477,917 B1 * 10/2016 Koch ................. G06K 17/0022
12,153,986 B2 11/2024 Butler et al.
2003/0006633 A1 1/2003 Clothier
2004/0027243 A1 2/2004 Carrender
2005/0234778 A1 10/2005 Sperduti et al.
2007/0188306 A1 8/2007 Tethrake et al.
2007/0297378 A1 12/2007 Poyhonen et al.
2008/0048021 A1 2/2008 Shieh
2008/0108261 A1 5/2008 Swan et al.
(Continued)

OTHER PUBLICATIONS

FAIPP Pre-Interview Communication dated Sep. 10, 2015, U.S. Appl. No. 14/277,045, filed May 14, 2014.
(Continued)

*Primary Examiner* — Brian A Zimmerman
*Assistant Examiner* — Cal J Eustaquio

(57) ABSTRACT

A method for implementing a software-based (SB) radio frequency identification (RFID) tag is disclosed. The method comprises storing first RFID identity data in a memory of the SB RFID tag, storing second RFID identity data in the memory of the SB RFID tag; and receiving via an antenna coupled to the SB RFID tag an RFID interrogation signal from an RFID reader and, in response determining by a processor of the SB RFID tag a status of an RFID identity selection criterion, selecting one of the first RFID identity data and the second RFID identity data, based on the status of the RFID identity selection criterion; and sending the selected one of the first RFID identity data and the second RFID identity data to the RFID reader via an antenna coupled to the SB RFID tag.

15 Claims, 6 Drawing Sheets

(56) References Cited

U.S. PATENT DOCUMENTS

| | | | |
|---|---|---|---|
| 2008/0136599 | A1 | 6/2008 | Sugano et al. |
| 2009/0326685 | A1 | 12/2009 | Meixner et al. |
| 2010/0093428 | A1 | 4/2010 | Mattice et al. |
| 2011/0298593 | A1 | 12/2011 | Sugiyama |

OTHER PUBLICATIONS

FAIPP Office Action dated Dec. 11, 2015, U.S. Appl. No. 14/277,045, filed May 14, 2014.
Notice of Allowance dated Jun. 17, 2016 U.S. Appl. No. 14/277,045, filed May 14, 2014.
Notice of Allowance dated Jul. 26, 2024 U.S. Appl. No. 18/167,066, filed Feb. 9, 2023.

* cited by examiner

SOFTWARE-BASED RFID TAG EMULATOR

CROSS-REFERENCE TO RELATED APPLICATIONS

This application is a continuation of and claims priority under 35 U.S.C. § 120 to U.S. patent application Ser. No. 18/167,066 filed on Feb. 9, 2023, entitled "Software-Based RFID Tag Emulator" by Robert Keith Butler, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some wireless identification (ID) tags respond to a radio frequency (RF) signal from a reader device by emitting an RF response signal. Some wireless ID tags have a battery or other power storage component, while other such tags harvest power from an ambient electromagnetic field. Some wireless ID tags emit an RF response signal in response to a signal comprising predetermined data, while other wireless ID tags emit an RF response signal in response to detecting RF radiation in a predetermined RF frequency band. Some such wireless ID tags are referred to as RFID tags.

SUMMARY

In an embodiment, a method for implementing a software-based (SB) radio frequency identification (RFID) tag is disclosed. The method comprises storing first RFID identity data in a non-transitory memory of the SB RFID tag, storing second RFID identity data in the non-transitory memory of the SB RFID tag; and receiving via an antenna coupled to the SB RFID tag an RFID interrogation signal from an RFID reader and, in response determining by a processor of the SB RFID tag a status of an RFID identity selection criterion, selecting one of the first RFID identity data and the second RFID identity data, based on the status of the RFID identity selection criterion; and sending the selected one of the first RFID identity data and the second RFID identity data to the RFID reader via an antenna coupled to the SB RFID tag.

In yet another embodiment, a method for implementing a SB RFID tag in user equipment (UE) is disclosed. The method comprises receiving an RFID interrogation signal from an RFID reader while the UE is in a low power mode, completing a handshake protocol with the RFID reader, wherein the handshake protocol is stored in a non-transitory memory of the SB RFID tag, and sending an RFID identity to the RFID reader only after completing the handshake protocol with the RFID reader.

In another embodiment, a device configured to provide a wireless connectivity function and a SB RFID tag is disclosed. The device comprises an antenna, a user interface, a memory that comprises a non-transitory memory, and a processor coupled to the non-transitory memory, the user interface, and the antenna. The device also comprises a wireless connectivity function stored in the non-transitory memory that, when executed by the processor receives an input signal from the user interface, sends first information wirelessly to a first external device via the antenna, the first information related to the input signal, receives second information wirelessly from the first external device via the antenna, and sends a display signal to the user interface, the display signal related to the second information. The device further comprises a SB RFID tag application stored in the non-transitory memory that, when executed by the processor receives an RFID interrogation signal from an RFID reader via the antenna and, in response to the RFID interrogation signal, sends RFID identity data stored in the non-transitory memory to the RFID reader via the antenna.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
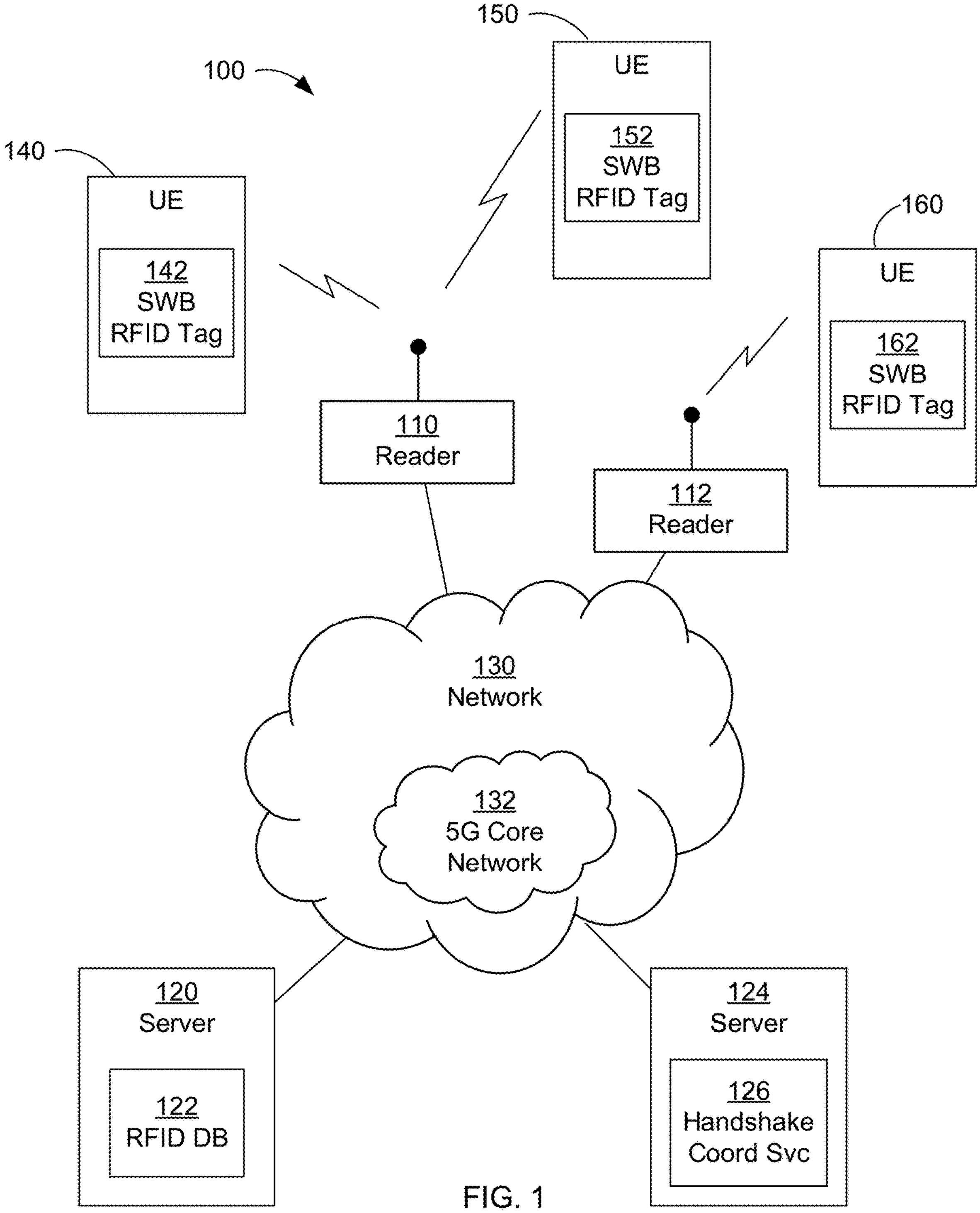
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A hardware RFID tag can be emulated by a software-based (SB) radio frequency identification (RFID) tag on user equipment (UE) that provides other functions and capabilities and has an on-board source of power. The UE may be a handheld device, such as a smart phone or tablet; a fixed device, such as a laptop computer or modem; or any other device having suitable processing power, RFID communications, and wired or wireless network communication capability. The SB RFID tag can be configured with two or more RFID identities and can respond to an RFID reader probe by broadcasting one of the RFID identities based on context. The context may be a code or password presented by the probing RFID reader. The context may be a location of the UE (e.g., a work location, a sports venue, or a toll tag station on an expressway).

A user may be able to select a RFID identity using a user interface associated with the SB RFID tag. In one example, two users may communicate online (e.g., by email or e-commerce portal) for the purchase by one user of an item being sold by the other user. Where both users have UEs that have SB RFID tag emulators as described herein, as well as software-based RFID reader emulators, the buyer and seller may each select an RFID identity for their respective SB RFID tag and, using local applications installed on their UEs, send the RFID identity securely to the other party. When the parties later meet in person, the parties' UEs are able to send RFID reader interrogations to each other and receive RFID tag responses comprising the exchanged RFID identities, allowing the buyer and seller to authenticate their identities to each other as the parties to the transaction.

A method for identification of a device comprising an SB RFID tag emulator and SB RFID reader emulator, the method comprising generating by a first device a first RFID identity and storing the first RFID identity in local memory of the first device; sending by the first device via a network to a second device the first RFID identity; receiving from the second device via the network a second RFID identity and storing the second RFID identity in the local memory of the first device; receiving by the first device from the second device a first RFID reader interrogation message comprising a first interrogation RFID identity; determining by the first device whether the first interrogation RFID identity matches the second RFID identity stored in the local memory of the first device; and if it is determined that the first interrogation RFID identity matches the second RFID identity, sending a second RFID reader interrogation message comprising the first RFID identity.

The SB RFID tag UE may exercise a sleep mode of operation in which the SB RFID tag functionality remains unresponsive or at least inactive, until a time-out occurs or until some trigger event occurs. Different RFID identities stored and/or presented by the SB RFID tag can be associated with different owners, for example as a result of transfer of ownership.

RFID readers have been deployed to read RFID tags in support of a variety of use cases, including inventory control, billing, sales, and others. UE emulating the SB RFID tag provide additional benefits in such use cases and in additional use cases. New RFID identities may be created and installed immediately, based on events occurring to or with the UE. Prior to adding a physical RFID tag to a UE, the SB RFID tag may emulate the physical RFID tag during development, manufacturing, testing, or other stages of the device lifecycle. The SB RFID tag may be used when conditions under which the RFID tag will respond need to be modified. The SB RFID tag may be used for interactively increasing tag security and identifying both the tag and the RFID reader.

A UE emulating the SB RFID tag may have different RFID identities at different stages of its lifecycle. The UE may have an RFID identity assigned by a manufacturer while in the manufacturer's facility. When transferred to a retailer, the SB RFID tag may have a first retailer RFID identity, for retailer inventory purposes. When sold to a customer, the SB RFID tag may be changed to a first customer RFID identity. If the UE is returned to the retailer for a refund, the SB RFID tag may be assigned a second retailer RFID identity, for 'previously owned' invoicing. When resold, the SB RFID tag may be changed to a second customer RFID identity.

A method for providing an RFID lifecycle identification of a device comprising an SB RFID tag emulator, the method comprising receiving by the device a first RFID configuration command comprising a first device identifier and a first lifecycle identifier; determining whether the first device identifier matches an RFID identifier stored in a local memory of the device and, if the device identifier matches the RFID identifier, storing the first lifecycle identifier in the local memory of the device as a device lifecycle identifier; receiving by the device a second RFID configuration command comprising a second device identifier and a second lifecycle identifier; determining whether the second device identifier matches the RFID identifier stored in the local memory of the device and, if the second device identifier matches the RFID identifier, storing the second lifecycle identifier in the local memory of the device as the device lifecycle identifier.

The retailer inventory may include a large number of UEs, resulting in response interference when a retailer RFID reader sends an interrogation signal. For such circumstances, the SB RFID tag may have an Inactive mode, in which it is receiving, but not responding to, interrogation signals from the RFID reader. In some cases, the SB RFID tag may enter and leave this mode at predetermined times of day. For example, the SB RFID tag may become Active during the opening and closing of business, in order to be available for an inventory interrogation process, but make itself Inactive at other times, so as not to contribute to response interference and/or not to be discoverable to an RFID reader operated by a malicious actor. The SB RFID tag may also be responsive to Activate and Inactivate commands from a properly authorized RFID reader.

A method for identification of a device comprising an SB RFID tag emulator, the method comprising causing the SB RFID tag emulator to enter an inactive mode at a first time of day, wherein the SB RFID tag emulator receives, but does not respond to, interrogation signals from an RFID reader; and causing the SB RFID tag emulator to enter an active mode at a second time of day, wherein the SB RFID tag emulator both receives and responds to interrogation signals from the RFID reader.

The UE may be configured to implement the SB RFID tag so that RFID tag functionality is available even when the UE is otherwise in a low power mode. In some situations, for example when user interaction is required as part of an RFID interaction, the UE may come out of low power mode in response to a message from an RFID reader.

In some circumstances, the SB RFID tag may be assigned additional RFID identities, in addition to, for example, the customer RFID identity mentioned above. If the user takes a product to a repair shop, they may allow an RFID reader in the repair shop to assign a repair RFID identity to the SB RFID tag of the UE. After repairs are completed, the repair RFID identity may be read by the repair shop RFID reader to authorize the user to collect the repaired product. The user may also remove (or authorize the repair shop RFID reader to remove) the repair RFID identity from the SB RFID tag of the UE.

A method for providing a temporary RFID identification of a device comprising an SB RFID tag emulator, the method comprising receiving by the device a first user command and, in response, entering a temporary ID programming mode; receiving by the device while in the temporary ID programming mode an RFID configuration command from an RFID reader, the RFID configuration command comprising an identifier of the RFID reader and a temporary identifier; storing in a local memory of the device the identifier of the RFID reader and the temporary identifier; exiting by the device from the temporary ID programming mode; receiving by the device an RFID interrogation signal comprising the identifier of the RFID reader; sending from the device an RFID response comprising the temporary identifier; and responding by the device to a user command by deleting the temporary identifier from the local storage.

The user may control whether the SB RFID tag responds or does not respond to RFID reader interrogations. Further when the SB RFID tag has been assigned multiple RFID identities, the user may control which, if any, individual RFID identities are visible to RFID reader interrogations. This may provide the user with assurance that the disabled SB RFID tag(s) cannot be used to track the user.

The user may also program desired data into an RFID identity stored in the SB RFID tag. The user may further associate desired data with an RFID identity, the data to be shared with an RFID reader once the SB RFID tag has authenticated the RFID reader.

The SB RFID tag and the RFID reader may authenticate each other by successfully exchanging mutually encrypted messages. In some embodiments, authentication may additionally be performed using a predetermined handshake protocol. The SB RFID tag may use a first protocol with a first RFID reader and a second protocol with a second RFID reader. The RFID reader may use different protocols with different SB RFID tags. The same SB RFID tag and RFID reader may change the protocol after one or more uses.

The handshake protocol may involve one or more of several characteristics of the SB RFID tag's responses to the RFID reader's interrogations. A predetermined number of interrogations by the RFID reader may be included in the handshake. The SB RFID tag may respond to or acknowledge only certain ones of the RFID reader's interrogations. The SB RFID tag may respond with predetermined information other than the RFID identity to certain ones of the RFID reader's interrogations. The SB RFID tag may respond at one or more predetermined RF power levels to one or more of the RFID reader's interrogations.

The SB RFID tag and RFID reader may exchange network messages with a trusted handshake coordination service in the network that serves as an intermediary in negotiating a new protocol to be used. Such a process is performed using encrypted network messages, which improves security by reducing over-the-air transmission of SB RFID tag information and provides a second factor of authentication for the SB RFID tag and the RFID reader in the handshake negotiation. The handshake protocol may be as simple as an RFID tag identity value sent by the handshake coordination service to both the SB RFID tag and the RFID reader, to allow the RFID reader to authenticate the SB RFID tag.

Use of the handshake protocol may be triggered by the SB RFID tag or by RFID reader. An initial, non-handshake read request from the RFID reader may include information triggering the SB RFID tag to use a previously negotiated or otherwise predetermined handshake protocol. The SB RFID tag may trigger use of the handshake protocol by sending the RFID reader an unsolicited RFID tag response.

Negotiation of the handshake protocol may occur as an initial part of the interaction between the SB RFID tag and the RFID reader. In a first example, the SB RFID tag receives an interrogation from the RFID reader but, before responding, the SB RFID tag contacts the handshake coordination service. The handshake coordination service sends a handshake protocol to both the SB RFID tag and the RFID reader to use in response to the current interrogation or at a next interrogation from the RFID reader.

In a second example of handshake protocol negotiation occurring as an initial part of the interaction between the SB RFID tag and the RFID reader, upon arriving at a predetermined location, the SB RFID tag may produce an unsolicited RFID tag response that is detected by the RFID reader. To authenticate the SB RFID tag, the RFID reader may contact the handshake coordination service, which (i) indicates that the Tag is likely collocated with the RFID reader based network messages between the handshake coordination service and the SB RFID tag or its UE, or (ii) sends a handshake protocol to both the SB RFID tag and the RFID reader to use in response to the unsolicited RFID tag response or in response to an interrogation from the RFID reader.

In a third example of handshake protocol negotiation occurring as an initial part of the interaction between the SB RFID tag and the RFID reader, the SB RFID tag may use a temporary RFID tag identity (rather than its primary RFID tag identity) to respond to an interrogation by the RFID reader. The temporary RFID tag identity may expire after a single use, a predetermined number of uses, or a predetermined amount of time. The temporary RFID tag identity is configured to cause the RFID reader to contact the handshake coordination service to send a handshake protocol to both the SB RFID tag and the RFID reader. The SB RFID tag may then use the handshake protocol and its primary RFID tag identity in a succeeding interaction between the SB RFID tag and the RFID reader. The use of the temporary RFID tag identity improves security by (i) reducing the number of times the primary RFID tag identity is sent over the air and (ii) reducing the likelihood of successful tracking of the UE through communication with the SB RFID tag.

The UE emulating the SB RFID tag may further include RFID Tag Monitoring software that is configured to detect a malicious actor's attempts to (i) deactivate an RFID tag (in this case the SB RFID tag) by sending an RFID KILL command to render the tag unresponsive or (ii) to make the SB RFID tag active or responsive to interrogations by setting the SB RFID tag to the VISIBLE state. The RFID Tag Monitoring software is configured to detect commands intended to change the behavior of the SB RFID tag and flag such commands when unexpected or illegitimate to the user or to a security server on the network. Such RFID Tag Monitoring software may also be configured either to facilitate or make more difficult tracking of the UE emulating the SB RFID tag by enabling and/or disabling the SB RFID tag functionality.

Returning to the repair shop example discussed above, the user may be uncomfortable with the possibility that someone could track their movements using the repair RFID identity assigned by the repair shop RFID reader. The RFID Tag Monitoring software may be configured to prevent the SB RFID tag from responding with the repair RFID identity unless, for example, (i) a signal received from a user interface of the UE indicates authorization by the user to respond or (ii) a signal received from a location sensing system indicates the UE is in a location associated with the repair shop.

Turning now to FIG. 1, a communication system 100 according to the disclosure is described. In an embodiment, the system 100 comprises RFID readers 110 and 112, and servers 120 and 124, communicating wired or wirelessly via a network 130. The network 130 may be one or more public networks, one or more private networks, or a combination thereof. The network 130 may comprise or be coupled to a 5G core network 132 or, in other embodiments, a 4G or 4G Long Term Evolution (LTE) network.

The RFID readers 110 and 112 may be in RF communication with one or more UEs 140, 150, and 160 that are emulating SB RFID tags 142, 152, and 162, respectively. The RFID readers 110 and 112 may communicate with the SB RFID tags 142, 152, and 162 using one or more frequency ranges, such as an 850 MHz frequency band, a 1900 MHz frequency band, a 2800 MHz frequency band, a 3900 MHz frequency band, a 946 MHz to 948 MHz frequency band, and a frequency band in a 47 GHz to 60 GHz frequency range.

The server 120 provides a secure database function 122 for RFID identities. Identities of SB RFID tags that are created by authenticated SB RFID tags, RFID readers, and/or third parties may be stored in the secure database function 122. Identities of SB RFID tags and the RFID readers that are authorized to read them may be stored in the secure database function 122. The server 124 provides a handshake coordination service 126 for use by authenticated SB RFID tags, RFID readers, and/or third parties. While the secure database function 122 and the handshake coordination service 126 are shown on separate servers in FIG. 1, it will be understood that in other embodiments the secure database function 122 and the handshake coordination service 126 may be provided on a single server and either or both may be provided by multiple servers.

Figure 2:
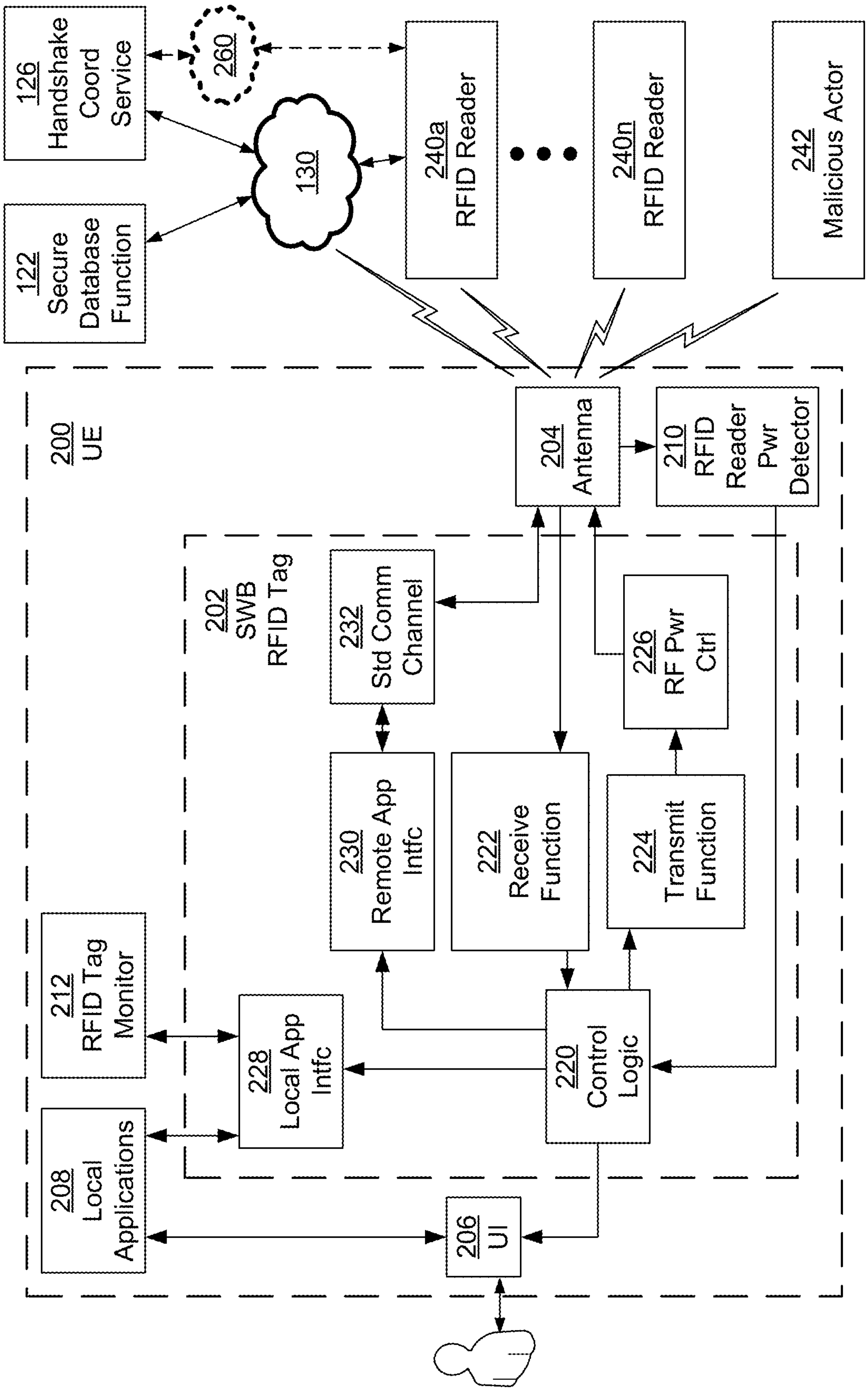
FIG. 2 is a block diagram of software and hardware of a user equipment (UE) according to an embodiment of the disclosure.

FIG. 2 is a block diagram of software and hardware of UE 200 according to an embodiment of the disclosure. The UE 200 comprises an antenna 204 and a user interface (UI) 206. The UI 206 may include liquid crystal displays (LCDs), touch screen displays, keyboards, keypads, switches, dials, mice, track balls, voice recognizers, and other devices for outputting information to and receiving information from a user.

As will be described with reference to FIG. 3, the UE 200 also includes processing circuitry configured to execute software elements of the UE 200 and the SWB RFID tag 202. Software elements of the UE 200 include one or more local applications 208 and an RFID tag monitor 212. The UE 200 further comprises a RFID reader power detector 210, which may be a combination of hardware and software elements.

The control logic 220 is communicatively coupled to a remote application interface 230 which communicates externally to the UE 200 (for example to the network 130) via a standard communication channel 232, such as Long-Term Evolution (LTE), 5G cellular or other longer range communication system, or via WiFi, Zigbee, Bluetooth or other shorter range communication system. The standard communication channel 232 is coupled to the antenna 204. In other embodiments, the standard communication channel 232 may be coupled via a wired communication link to the network 130 or other external device.

The local applications 208 may include an ecommerce or banking portal, a browser, or other wireless connectivity function configured to receive a user input signal from the UI 206 and send information related to the user input signal to an Internet server via the network 130. The wireless connectivity function may be further configured to receive further information via the network 130 and send a display signal related to the further information to the user interface.

The UE 200 is wirelessly coupled to one or more RFID readers 240*a*-240*n*. The UE 200 may also be wirelessly coupled to one or more malicious actors 242 masquerading as RFID readers or otherwise attempting to read or control the SWB RFID tag 202. The UE 200 may further be wired or wirelessly coupled, as described with reference to FIG. 1, via the network 250 to the secure database function 122 and the handshake coordination service 126. The handshake coordination service 126 may be coupled by the network 250 or by a separate network 260 to one or more of the RFID readers 240*a*-240*n*. The network 260 may be wired or wireless and may provide additional or alternative security features to those of the network 130.

Software elements of the SWB RFID tag 202 include control logic 220, which is communicatively coupled to one or more of the local applications 208 and the RFID tag monitor 212. The control logic 220 is also communicatively coupled to the RFID reader power detector 210 and configured to receive a signal indicating that RF power from an RFID reader has been detected.

The control logic 220 is also communicatively coupled to a receive function 222 that provides RFID reader detection, demodulation, and decoding, which may be a combination of hardware and software elements coupled to the antenna 204. Hardware elements of the receive function 222 may demodulate RF signals received from the RFID readers 240*a*-240*n* via the antenna 204 to baseband signals and convert the baseband signals from analog to digital. Software elements of the receive function 222 may decode messages in the signals and detecting content of the messages.

The control logic 220 is also communicatively coupled to transmit function 224, which is communicatively coupled to an RF power control function 226, which is coupled to the antenna 204. Software elements of the transmit function 224 may encode into baseband signals messages from the control logic 220 to the RFID readers 240*a*-240*n*. Hardware elements of the transmit function 224 may modulate the baseband signals to RF signals, which are coupled to the RF power control function 226. Based on control signals received from the control logic 220 via the transmit function 224, the RF power control function 226 may amplify the RF signals received from the transmit function 224 to specified RF power levels. Such RF power levels may be specified as part of a handshake protocol (as described above) or based on RF noise as detected by the receive function 222 or RF power levels as detected by the RFID reader power detector 210 to (i) reduce, if possible, the transmission range of RFID responses, to reduce eavesdropping on reader-tag communication or (ii) to increase RF power to overcome a noisy RF environment or a distant RFID reader.

Figure 3:
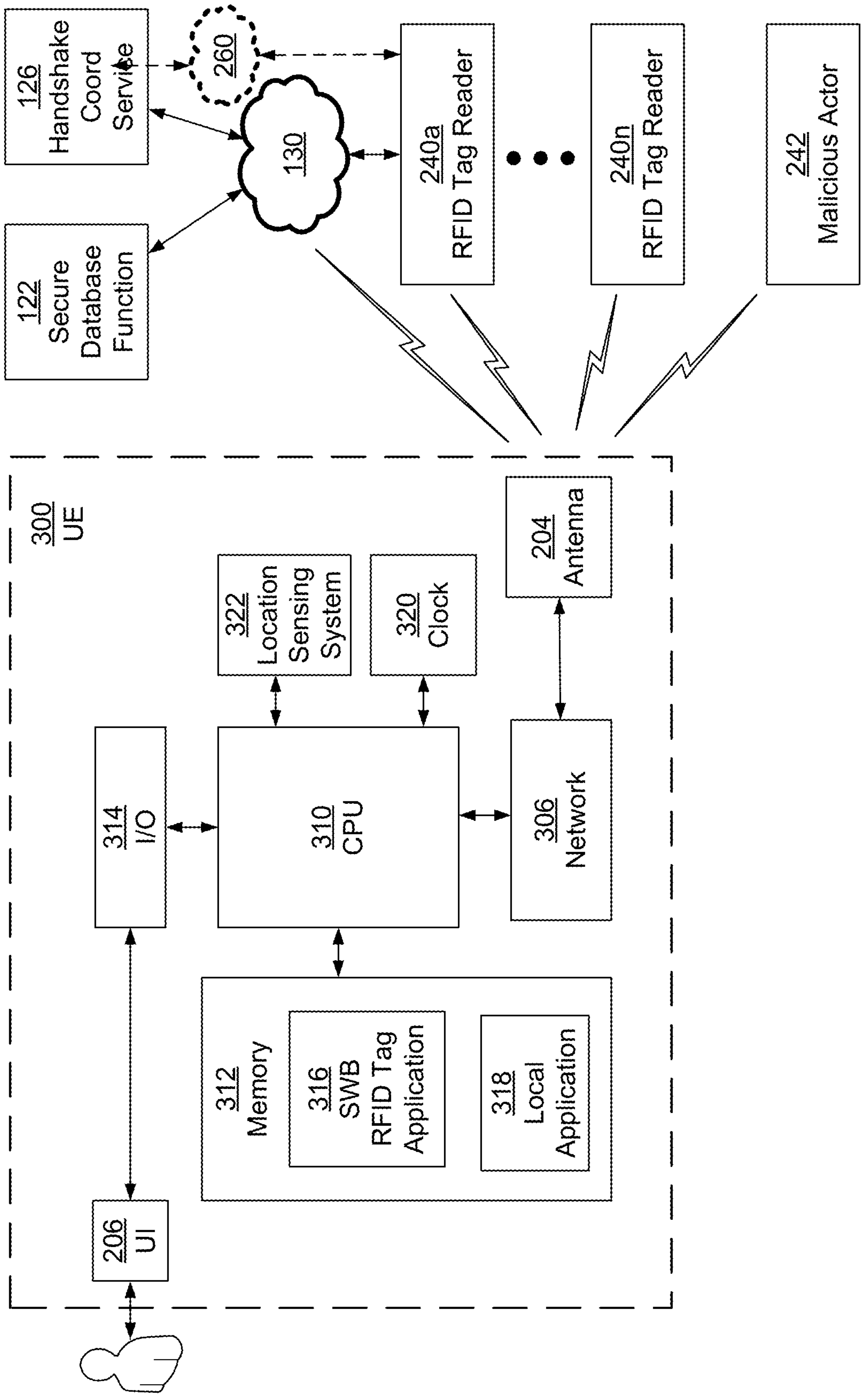
FIG. 3 is a hardware block diagram of a UE according to a second embodiment of the disclosure.

FIG. 3 is a hardware block diagram of a UE 300 according to a second embodiment of the disclosure. The UE 300 includes a processor 310 (which may be referred to as a central processor unit or CPU) that is in communication with memory devices 312 including secondary storage, ROM, and RAM. The processor 310 is also in communication with input/output (I/O) devices 314 (for example, the UI 206), a clock circuit 320, a location sensing system 322, and network connectivity devices 306 (for example, the antenna 204, hardware elements of the receive function 222, and the RF power control function 226). The processor 310 may be implemented as one or more CPU chips.

In various embodiments, the clock circuit 320 may be a standalone clock circuit, may receive time information from the location sensing system 322, or may receive time information via wired or wireless communication from an external device. The time information may include time of day information and/or date information.

It is understood that by programming and/or loading executable instructions onto the UE 300, at least one of the CPU 310 and the memory 312 are changed, transforming the UE 300 in part into a particular machine or apparatus having the novel functionality taught by the present disclosure, such as an emulator of a SWB RFID tag. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the UE 300 is turned on or booted, the CPU 310 may execute a computer program or application. For example, the CPU 310 may execute software or firmware stored in the ROM or RAM of the memory 312. In some cases, on boot and/or when the application is initiated, the CPU 310 may copy the application or portions of the application from secondary storage to RAM or to memory space within the CPU 310 itself, and the CPU 310 may then execute instructions that the application is comprised of. During execution, an application may load instructions into the CPU 310, for example load some of the instructions of the application into a cache of the CPU 310. In some contexts, an application that is executed may be said to configure the CPU 310 to do something, e.g., to configure the CPU 310 to perform the function or functions promoted by the subject application. When the CPU 310 is configured in this way by the application, the CPU 310 becomes a specific purpose computer or a specific purpose machine.

The secondary storage of the memory 312 is used for non-volatile storage of data and as an over-flow data storage device if the RAM of the memory 312 is not large enough to hold all working data. The secondary storage may be used to store programs which are loaded into the RAM when such programs are selected for execution. The ROM of the memory 312 is used to store instructions and perhaps data which are read during program execution. The ROM is a non-volatile memory device which typically has a small memory capacity relative to the larger memory capacity of the secondary storage. The RAM is used to store volatile data and perhaps to store instructions. Access to both the ROM and RAM may be faster than to the secondary storage. The secondary storage, the RAM, and/or the ROM may be referred to in some contexts as computer readable storage media, non-transitory memory, and/or non-transitory computer readable media.

The processor 310 executes instructions, codes, computer programs, scripts which it accesses from the secondary storage, the ROM, or the RAM of the memory 312. While only one processor 310 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage, the ROM, or the RAM may be referred to in some contexts as non-transitory instructions and/or non-transitory information.

In some contexts, the secondary storage, the ROM, or the RAM of the memory 312 may be referred to as a non-transitory computer readable medium or a computer readable storage media. A dynamic RAM embodiment of the RAM, likewise, may be referred to as a non-transitory computer readable medium in that while the dynamic RAM receives electrical power and is operated in accordance with its design, for example during a period of time during which the UE 300 is powered up and operational, the dynamic RAM stores information that is written to it. Similarly, the processor 310 may comprise an internal RAM, an internal ROM, a cache memory, and/or other internal non-transitory storage blocks, sections, or components that may be referred to in some contexts as non-transitory computer readable media or computer readable storage media. The memory 312 includes a SWB RFID tag application 316 and one or more local applications 318 comprising executable instructions that, when executed by the CPU 310, provide functionality as described herein. The SWB RFID tag application 316 includes the software elements of the SWB RFID tag 202 described with reference to FIG. 2.

In some embodiments, the wireless connectivity functions of the local applications 208 described with reference to FIG. 2 further include an update application configured to update the SB RFID tag application 316. The update application is configured to receive SB RFID tag application update information via the network 130 and to update the SB RFID tag application 316 with the SB RFID tag application update information. In some such embodiments, the update application sends a request for the SB RFID tag application update information to an external device. Such a request may be sent in response to user input received via the UI 206.

In some embodiments, the SB RFID tag application update information includes instructions configured to add one or more additional functions to the SB RFID tag application 316. In other embodiments, the SB RFID tag application update information is configured to enable or disable one or more functions already present in the instructions of the SB RFID tag application.

In other embodiments, the wireless connectivity functions of the local applications 208 include RFID identity data applications that are configured to enable the user to program desired RFID identity data into the SB RFID tag application. The SB RFID tag application is configured to receive information relating to the desired RFID identity data from the user interface, to generate modified RFID identity data based on the third information, and to store the modified RFID identity data in the memory. Such RFID identity data applications may be used, for example, in the scenario described above where a buyer and seller exchange RFID identity information to identify themselves to each other.

Figure 4:
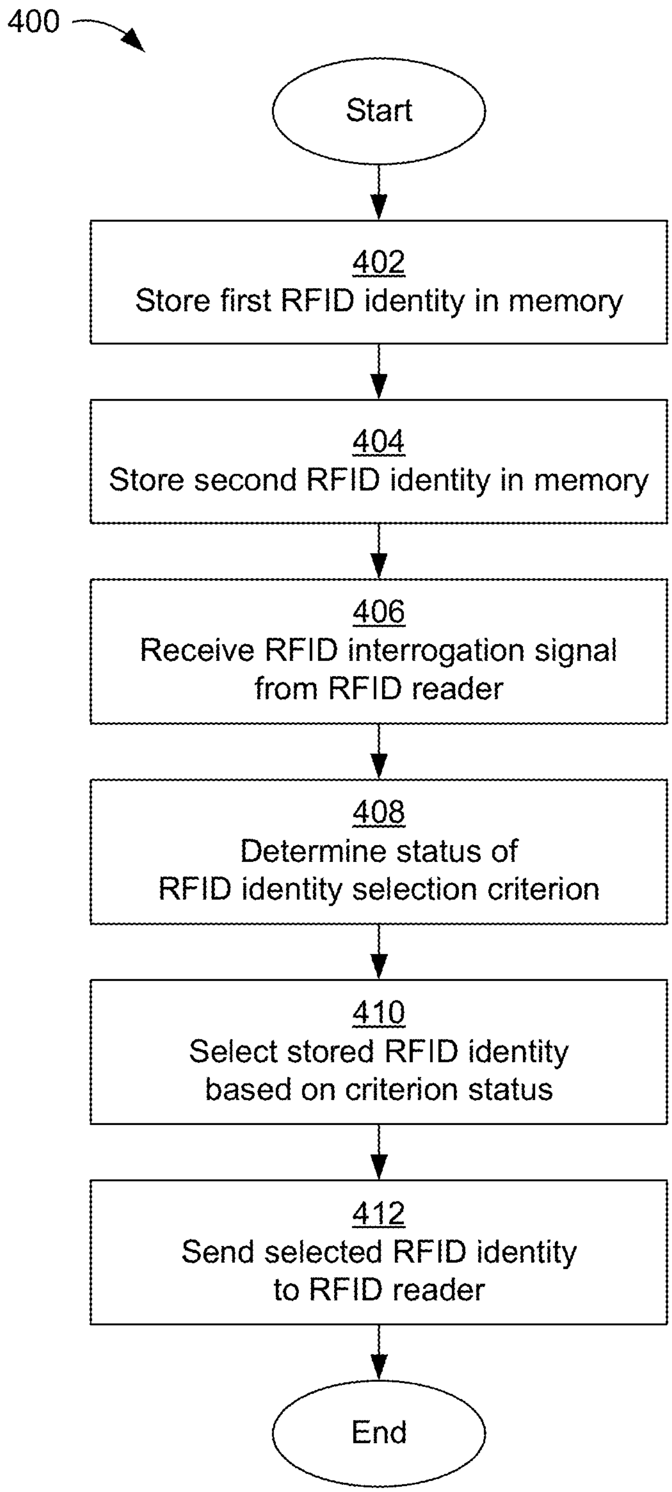
FIG. 4 is a flow chart of a first method according to an embodiment of the disclosure.

FIG. 4 is a flow chart of a first method 400 according to an embodiment of the disclosure. In an embodiment, the method 400 is a method for implementing a first embodiment of the SWB RFID tag 202 of FIG. 2 or the SWB RFID tag application 316 of FIG. 3. Reference to elements of the UE 300 will be made for purposes of the following description.

At step 402, the CPU 310 stores in the memory 312 a first RFID identity data. At step 404, the CPU 310 stores in the memory 312 a second RFID identity data. Either step 402 or 404 may include the steps of (i) generating new RFID identity data, (ii) storing the new RFID identity data as the first or second RFID identity data, and (iii) sending a message via the antenna 204 to an external device (for example, the secure database function 122), where the message is configured to cause the external device to store the newly generated RFID identity data.

At step 406, the CPU 310 receives via the antenna 204 an RFID interrogation signal from an RFID reader, for example the RFID reader 240*a*. At step 408, the CPU 310 determines a status of an RFID identity selection criterion (or criterion status). At step 410, based on the criterion status, the CPU 310 selects one of the first RFID identity data and the second RFID identity data. At step 412, the CPU 310 sends the selected RFID identity data to the RFID reader 240*a* via the antenna 204.

In some embodiments, in step 408 the CPU 310 determines the criterion status based on a signal received from the UI 206. The CPU 310 may present the user of the UE 300 with a dialog requesting that the user select one of the first and second RFID identities and the signal received from the UI 206 includes information relating to the user's selection. The CPU 310 may receive the signal, determine the criterion status, and store the determination in the memory 312 prior to the performance of step 408, or the CPU 310 may receive the signal and determine the criterion status as part of the performance of step 408.

In other embodiments, the CPU 310 determines the criterion status based on a signal received from the location sensing system 322, for example, a global positioning system (GPS) receiver. In some such embodiments, the CPU 310 compares location information in the signal to location information stored in the memory 312 or received from an external device such as the secure database function 122 or the handshake coordination service 126. The CPU 310 then determines the criterion status based on a result of the comparison, for example, based on whether the two locations are separated by less than a threshold distance.

In still other embodiments, the CPU 310 determines the criterion status based on reader information included in the RFID interrogation signal received in step 406, where the reader information relates to an identity of the RFID reader 240*a*. In some such embodiments, the CPU 310 compares the reader information to information stored in the memory 312 or received from an external device such as the secure database function 122 or the handshake coordination service 126. For example, communication with the secure database function 122 may result in the CPU 310 determining that the identity of the RFID reader 240*a* is associated with one of the first and second RFID identities and, in response, the CPU 310 selects that RFID identity in step 410.

In some embodiments, the RFID interrogation signal is received in one of an 850 MHz frequency band, a 1900 MHz frequency band, a 2800 MHz frequency band, a 3900 MHz frequency band, a 946 MHz to 948 MHz frequency band, and a frequency band in a 47 GHz to 60 GHz frequency range. In other embodiments, in step 412 the CPU 310 receives time information from a clock circuit, where the time information comprises one or both of time of day information and date information. The CPU 310 determines whether the time information meets a predetermined time criterion and sends sending the selected one of the first RFID identity and the second RFID identity only if it determines that the time information meets the predetermined time criterion. In one example, the predetermined time criterion may specify a period of time that is based on a time at which a retail facility closes.

Figure 5:
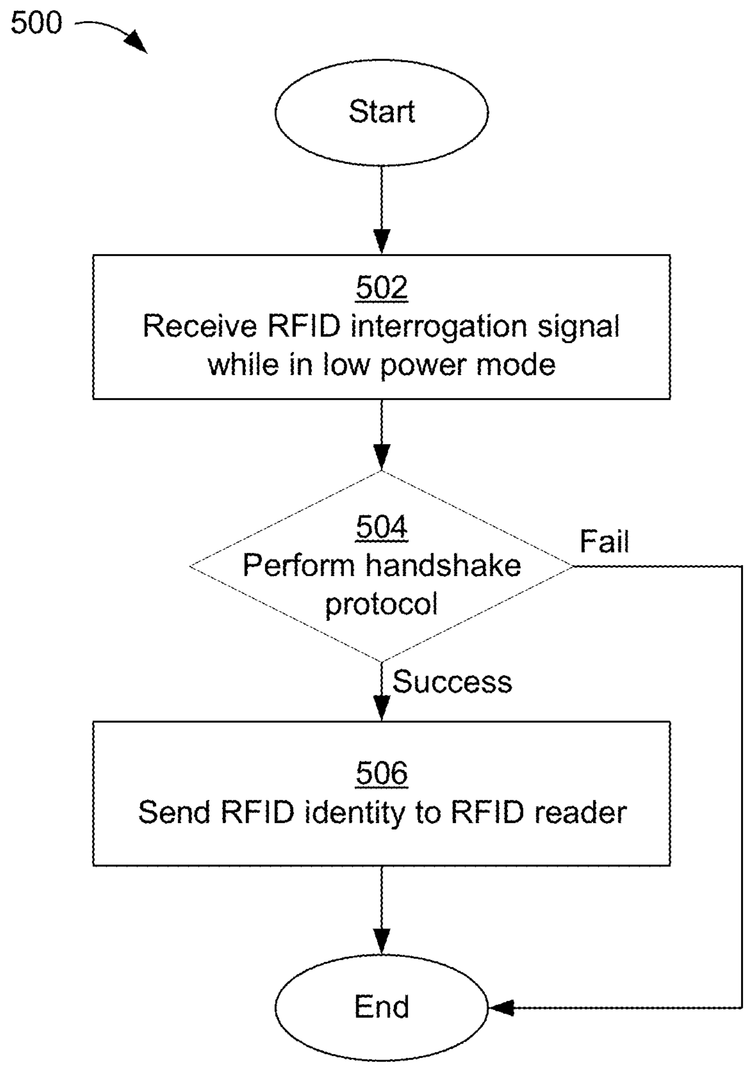
FIG. 5 is a flow chart of a second method according to an embodiment of the disclosure.

FIG. 5 is a flow chart of a second method 500 according to an embodiment of the disclosure. In an embodiment, the method 500 is a method for implementing a first embodiment of the SWB RFID tag 202 of FIG. 2 or the SWB RFID tag application 316 of FIG. 3. Reference to elements of the UE 300 will be made for purposes of the following description.

At step 502, while the UE 300 is in a low power mode, the CPU 310 receives via the antenna 204 an RFID interrogation signal from an RFID reader, for example the RFID reader 240*n*. At step 504, the CPU 310 performs a handshake protocol with the RFID reader 240*n*, where the handshake protocol is stored in the memory 312. If the handshake protocol fails, the method 500 ends. If the handshake protocol succeeds, at step 506 the CPU 310 sends the RFID identity of the SWB RFID tag to the RFID reader 240*n*.

In some embodiments, the UE 300 may be configured to remain in low power mode while performing the method 500. In other embodiments, the method 500 may cause the UE 300 to exit low power mode at some point, e.g., when interaction with the user via the UI 206 is required.

In some embodiments, the CPU 310 may have received the handshake protocol used in step 504 from an external device (e.g., the handshake coordination service 126) before storing the handshake protocol in the memory 312. In some such embodiments, the CPU 310 may exchange information with the external device via a communication network (e.g., the network 130) prior to receiving the handshake protocol from the external device.

In some embodiments, the UE 300 is configured to communicate with the RFID reader 240*n* in one of an 850 MHz frequency band, a 1900 MHz frequency band, a 2800 MHz frequency band, a 3900 MHz frequency band. In other embodiments, the UE 300 is configured to communicate with the RFID reader 240*n* in one of a 946 MHz to 948 MHz frequency band, and a frequency band in a 47 GHz to 60 GHz frequency range.

In various embodiments, the handshake protocol specifies a pattern of responses by the CPU 310 to specified ones of a series of RFID interrogation signals from an RFID reader. The pattern may include one or more of (i) not responding to the RFID interrogation signal, (ii) responding by sending predefined information other than the RFID identity, (iii) responding at a specified RF power level, and (iv) responding after a delay of a predetermined amount of time.

Figure 6:
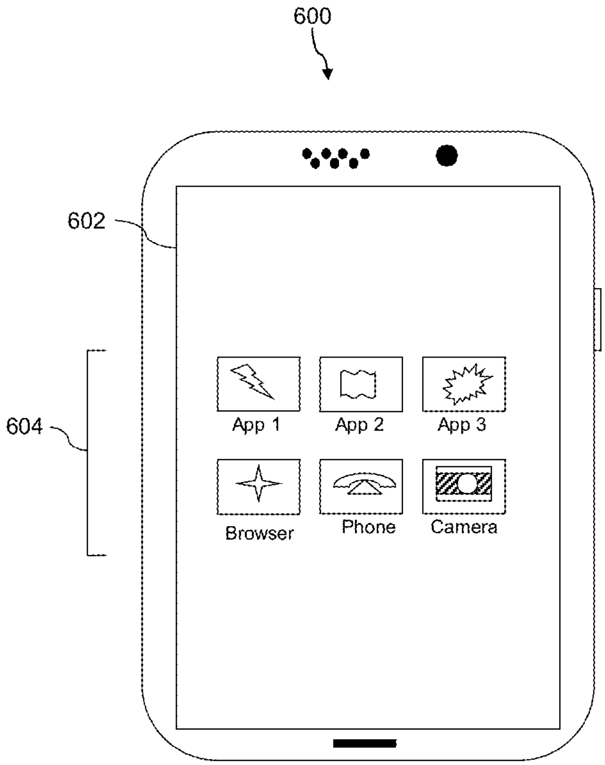
FIG. 6 is an illustration of a wireless communication device according to an embodiment of the disclosure.

FIG. 6 depicts the UE 600, which is operable for implementing aspects of the present disclosure, but the present disclosure should not be limited to these implementations. Though illustrated as a mobile phone, the UE 600 may take various forms including a wireless handset, a tablet, a pager, a personal digital assistant (PDA), a gaming device, or a media player. The UE 600 includes a touchscreen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 602 to show a web page. The web page may be obtained via wireless communications with a base transceiver station, a wireless network access node, a peer UE 600 or any other wireless communication network or system.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for implementing a software-based (SB) radio frequency identification (RFID) tag in user equipment (UE), the method comprising:

receiving an RFID interrogation signal from an RFID reader while the UE is in a low power mode;

completing a handshake protocol with the RFID reader, wherein the handshake protocol is stored in a non-transitory memory of the SB RFID tag and specifies a pattern of responses by the SB RFID tag to specified ones of a series of RFID interrogation signals from the RFID reader, the pattern including one or more of (i) not sending the response, (ii) sending predefined information other than the RFID identity in the response, (iii) sending the response at a specified RF power level, or (iv) sending the response delayed by a predetermined amount of time; and sending an RFID identity to the RFID reader only after completing the handshake protocol with the RFID reader.

2. The method of claim 1, further comprising causing the UE to exit the low power mode.

3. The method of claim 1, further comprising receiving the handshake protocol from an external device.

4. The method of claim 3, wherein the SB RFID tag exchanges information with the external device via a communication network prior to receiving the handshake protocol from the external device.

5. The method of claim 1, wherein the RFID interrogation signal is received in one of an 850 MHz frequency band, a 1900 MHz frequency band, a 2800 MHz frequency band, a 3900 MHz frequency band, a 946 MHz to 948 MHz frequency band, and a frequency band in a 47 GHz to 60 GHz frequency range.

6. The method of claim 3, further comprising contacting, by the SB RFID tag, the external device in response to receiving the RFID interrogation signal, wherein the handshake protocol is received from the external device after receiving the RFID interrogation signal.

7. The method of claim 6, wherein the external device sends the handshake protocol to the RFID reader in response to the contacting by the SB RFID tag.

8. A method for implementing a software-based (SB) radio frequency identification (RFID) tag, the method comprising:

receiving, by the SB RFID tag, an RFID interrogation signal from an RFID reader; in response to receiving the RFID interrogation signal, contacting, by the SB RFID tag, a handshake coordination service executing on a server before responding to the RFID interrogation signal;

receiving, by the SB RFID tag and the RFID reader from the handshake coordination service, the handshake protocol, wherein the handshake protocol specifies a pattern of responses by the SB RFID tag to specified ones of a series of RFID interrogation signals from the RFID reader, the pattern including one or more of (i) not sending the response, (ii) sending predefined information other than the RFID identity in the response, (iii) sending the response at a specified RF power level, or (iv) sending the response delayed by a predetermined amount of time;

completing the handshake protocol between the SB RFID tag and the RFID reader; and sending, by the SB RFID tag, an RFID identity to the RFID reader only after completing the handshake protocol.

9. The method of claim 8, wherein the RFID interrogation signal is received in one of an 850 MHz frequency band, a 1900 MHz frequency band, a 2800 MHz frequency band, a 3900 MHz frequency band, a 946 MHz to 948 MHz frequency band, and a frequency band in a 47 GHz to 60 GHz frequency range 11.

10. The method of claim 8, wherein the handshake protocol specifies a pattern of responses by the SB RFID tag to specified ones of a series of RFID interrogation signals from an RFID reader, the pattern including one or more of (i) not sending the response, (ii) sending predefined information other than the RFID identity in the response, (iii) sending the response at a specified RF power level, or (iv) sending the response delayed by a predetermined amount of time.

11. A method for implementing a software-based (SB) radio frequency identification (RFID) tag, the method comprising:

storing first RFID identity data and second RFID identity data in a non-transitory memory of the SB RFID tag such that the SB RFID tag is configured with both the first RFID identity information and the second RFID identity information;

receiving via an antenna coupled to the SB RFID tag an RFID interrogation signal from an RFID reader;

performing authentication of the SB RFID tag and the RFID reader by successfully exchanging mutually encrypted messages;

in response to the receiving the RFID interrogation signal and the authentication:

determining by a processor of the SB RFID tag a status of an RFID identity selection criterion, wherein the RFID identity selection criterion is determined based on one or more of: (i) a signal received from a user interface coupled to the SB RFID tag or (ii) a signal received from a location sensing system coupled to the SB RFID tag;

selecting one of the first RFID identity data or the second RFID identity data, based on the status of the RFID identity selection criterion; and sending the selected one of the first RFID identity data or the second RFID identity data to the RFID reader via an antenna coupled to the SB RFID tag.

12. The method of claim 11, wherein the RFID interrogation signal is received in one of an 850 MHz frequency band, a 1900 MHz frequency band, a 2800 MHz frequency band, a 3900 MHz frequency band, a 946 MHz to 948 MHz frequency band, or a frequency band in a 47 GHz to 60 GHz frequency range.

13. The method of claim 11, wherein the step of sending the selected one of the first RFID identity or the second RFID identity comprises:

receiving time information from a clock circuit, the time information comprising one or both of time of day information and date information;

determining whether the time information meets a predetermined time criterion; and sending the selected one of the first RFID identity or the second RFID identity only if it is determined that the time information meets the predetermined time criterion.

14. The method of claim 11, wherein the authentication is performed using a predetermined handshake protocol.

15. The method of claim 14, further comprising:

contacting, by the SB RFID tag, an external device in response to receiving the RFID interrogation signal;

receiving, by the SB RFID tag, the predetermined handshake protocol from the external device in response to the contacting by the SB RFID tag; and receiving, by the RFID reader, the predetermined handshake protocol from the external device in response to the contacting by the SB RFID tag, wherein the predetermined handshake protocol specifies a pattern of responses by the SB RFID tag to specified ones of a series of RFID interrogation signals from the RFID reader.

* * * * *